(12) United States Patent
Hillemann et al.

(10) Patent No.: US 6,723,408 B2
(45) Date of Patent: Apr. 20, 2004

(54) RESEALABLE ENVELOPE

(75) Inventors: Bruce J. Hillemann, Yardley, PA (US); Joseph DeRiggi, Levittown, PA (US)

(73) Assignee: A.D.M. Corporation, Middlesex, NJ (US)

( * ) Notice: Subject to any disclaimer, the term of this patent is extended or adjusted under 35 U.S.C. 154(b) by 0 days.

(21) Appl. No.: 10/139,343

(22) Filed: May 7, 2002

(65) Prior Publication Data

US 2003/0211268 A1 Nov. 13, 2003

(51) Int. Cl.[7] ................................. B65D 27/16
(52) U.S. Cl. .................... 428/40.1; 53/460; 53/481; 156/272.2; 156/275.1; 156/290; 383/52; 383/53; 383/54; 383/78; 383/81; 383/84; 383/86; 383/98; 383/99; 428/41.9; 428/42.1; 428/42.2; 428/42.3; 428/192; 428/194; 428/354; 229/70
(58) Field of Search .................. 428/40.1, 41.9, 428/42.1, 42.3, 42.2, 192, 194, 354; 383/52, 53, 54, 78, 81, 84, 86, 98, 99; 156/275.1, 290, 272.2; 53/481, 460; 229/70

(56) References Cited

U.S. PATENT DOCUMENTS 3,154,239 A * 10/1964 Madsen .................. 229/62
4,519,095 A 5/1985 Clayton
5,527,112 A 6/1996 Dais et al.
5,571,097 A 11/1996 Seth
5,783,012 A 7/1998 Porchia et al.
5,791,783 A 8/1998 Porchia et al.
6,032,854 A 3/2000 Greer et al.
6,048,100 A 4/2000 Thrall et al.

FOREIGN PATENT DOCUMENTS

EP           957045       * 11/1999

* cited by examiner

Primary Examiner—Nasser Ahmad
(74) Attorney, Agent, or Firm—Blank Rome LLP

(57) ABSTRACT

A resealable envelope comprising a flexible plastic back sheet, a backing adhesive applied on a back surface of the flexible plastic back sheet to attach the envelope to a package, a flexible plastic front sheet attached to the back sheet at their respective side edges and bottom edges, a flexible closure flap being adhered directly to the front surface of the back sheet at their respective top edges via a permanent adhesive and overlapping said front sheet, and a resealable adhesive located proximal to the top edge of the front sheet such that the resealable adhesive is capable of fastening said closure flap to the front sheet forming a resealable closure.

20 Claims, 2 Drawing Sheets

RESEALABLE ENVELOPE

FIELD OF THE INVENTION

The instant invention relates to a resealable, flexible plastic envelope having superior durability to those of the prior art. In particular, the closure flap of the instant invention can be repeatedly opened and resealed without damaging the integrity of the envelope.

BACKGROUND OF THE INVENTION

Adhesive type closure arrangements have been used to seal and/or close plastic bags such as those used for sandwiches, garbage containers, and other household uses. For example, U.S. Pat. No. 4,519,095 to Clayton describes a resealable flexible thermoplastic bag wherein the closure comprises at least one female channel member or strip-affixed to the bag and having a pressure sensitive adhesive layer on an internal portion of the channel strip such that the thickness of the adhesive layer is less than the interior depth of the walls of the channel strip. During shipment and storage the walls of the channel hold the pressure sensitive adhesive layer away from adjacent surfaces to prevent inadvertent sticking. Sealing of the bag is achieved by contacting the channel strip with a surface of the bag and exerting pressure along the strip whereby the pressure sensitive adhesive is contacted with a substantially flat portion of the surface and adhered thereto.

Clayton discloses a resealable plastic bag containing a channel with the adhesive layer positioned on a flap of the bag, a channel with the adhesive positioned on the body of the bag over which the flap will fold, and two female channel strips positioned on opposite sides of a bag opening to affect a double seal by pressing the two channels into contact such that one wall or bead of each channel is contacted by the adhesive layer in the opposing channel.

Other patents disclosing resealable, flexible plastic bags include U.S. Pat. Nos. 5,791,783 and 5,783,012, both to Porchia et al.; U.S. Pat. No. 5,527,112 to Dais et al.; and U.S. Pat. No. 6,032,854 to Greer et al.

One possible use of the resealable, flexible plastic bag is as a packing list envelope which is commonly used by courier services such as FedEx, U.S. Postal Service, etc. When a package is sent through the courier service, a list of the contents of the package, addresses of the addressee and sender, and various other pertinent information are placed into a transparent packaging envelope with the addresses visible through the front of the envelope. The back of the envelope is then attached to the package with an adhesive. Because, during the package processing, the envelope is subject to being opened and resealed for placing or removing items in the envelope, it is desirable to have an envelope that can repeatedly be opened and resealed without losing its integrity.

Thus it is desirable to avoid the problems of the prior art envelopes and provide a packing slip envelope that is resealable without damaging the integrity of the envelope and without the high cost.

SUMMARY OF THE IVENTION

One aspect of the invention is related to a packing slip envelope that is resealable with an resealable adhesive without damaging the integrity of the envelope. If the packing slip envelope to be attached to a package, an adhesive preferably permanent is provided on the back of the envelope. The envelope comprises a front sheet, a back sheet, and a closure flap. The front sheet has the same width as the back sheet and a shorter height. The back and front sheet are attached at their respective side edges and bottom edges via heat sealing. The closure flap attaches to the back sheet at their respective top edges via a permanent adhesive and overlaps the front sheet. To seal the envelope, a resealable adhesive is placed on the outside and adjacent to the top edge of the front sheet. The adhesive binds the closure flap overlap to the front sheet to seal the envelope. The permanent adhesive used to join the closure flap to the back sheet allows the envelope to be opened and resealed without damaging the several joints at the edges of the envelope. The envelope is preferably made of a plastic and can be either transparent or translucent. Printing can be provided on the face sheet or backing sheet.

Another aspect of the invention is related to the method of making the packing slip envelope.

BRIEF DESCRIPTION OF THE DRAWINGS

The foregoing background and summary, as well as the following detailed description of the drawings, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE DRAWINGS

Figure 2:
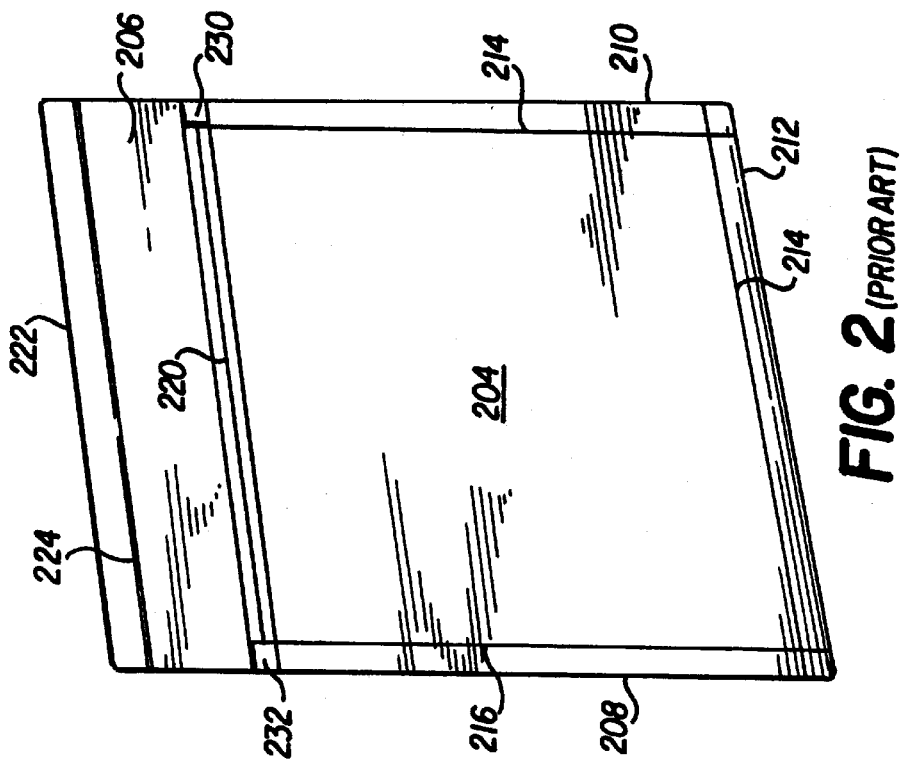
FIG. 2 depicts a front view of a prior art packing slip envelope having a ziplock seal in the closed position.

In the drawings, like numerals are used to indicate like elements throughout. Certain terminology is used for convenience only in this and is not limiting. The words "top," "bottom," and "side" designate directions in the drawings to which reference is made.

Figure 1:
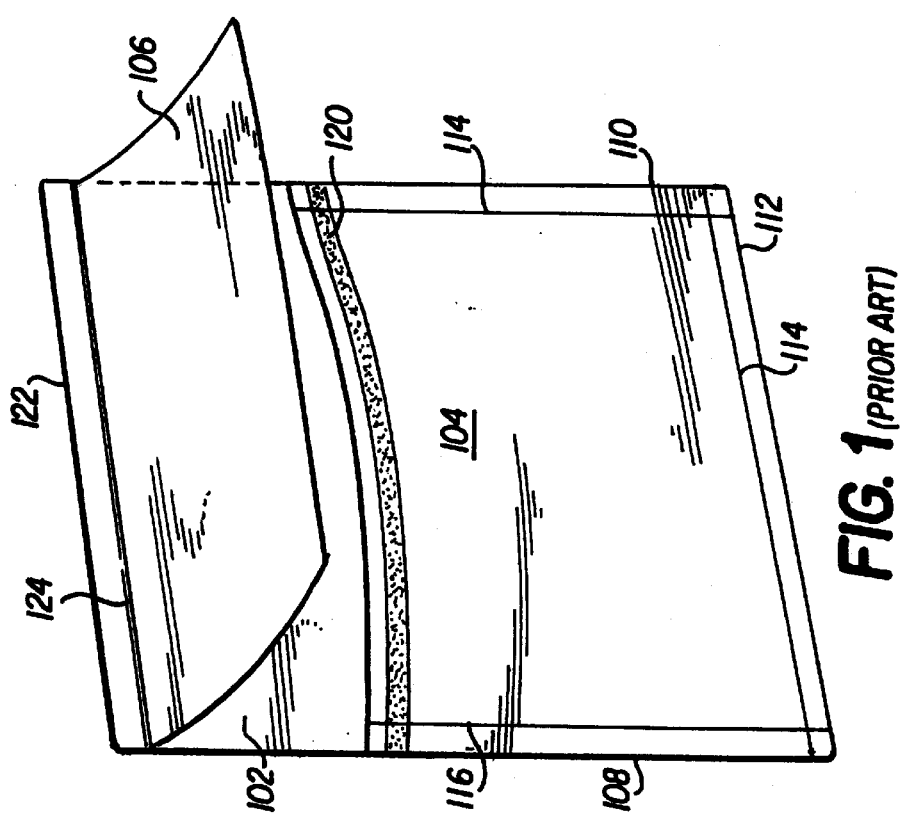
FIG. 1 depicts a front view of a prior art packing slip envelope having a resalable adhesive in the open position.

One possible packing list envelope is depicted in FIG. 1, showing an envelope made of a heat sealable plastic material having a back sheet 102, a front sheet 104, and a closure flap 106. The back sheet 102 and the front sheet 104 are attached at their respective sides edges 108 and 110 and bottom edges 112 via heat sealing resulting in heat seal lines 114, 116 and 118. The front sheet also contains a strip of resealable adhesive 120 on the front sheet. The closure flap 106 is attached to the back strip at their respective top edges 122 via heat sealing resulting in heat seal line 124. The closure flap 106 also overlaps the front sheet 104 such that the resealable adhesive strip is able to attach the closure flap 106 to the front sheet when the flap is in contact with the front sheet.

The main drawback of the envelope of FIG. 1 is the relative weakness of the heat seal joint of the closure flap to the back sheet. Typically, the opening of the envelope at the closure flap requires a force that results in a partial tear of the joint between the closure flap and the back sheet. This is due to the inherent inability of the heat seal joint to withstand the sudden force required to open the resealable adhesive closure.

In an attempt to solve the weak heat seal joint, the envelope shown in FIG. 2 is developed. FIG. 2 shows an envelope with a back sheet (not shown), front sheet 204, and closure flap 206. The back sheet and the front sheet 204 are attached at their respective sides edges 208 and 210 and bottom edges 212 via heat sealing resulting in heat seal lines 214, 216 and 218. The closure flap 206 is attached to the back strip at their respective top edges 222 via heat sealing resulting in heat seal line 224. The closure flap is also attached to the front sheet by heat sealing the ends 230 and 232 of the zip lock 220. In effect, this envelop is similar to the one depicted in FIG. 1, except that the resealable closure is of the ziplock type rather than a resealable adhesive. A major disadvantage of the ziplock type envelope is high cost, particularly the high cost of producing the ziplock, when compared to the resealable adhesive envelope.

Figure 4:
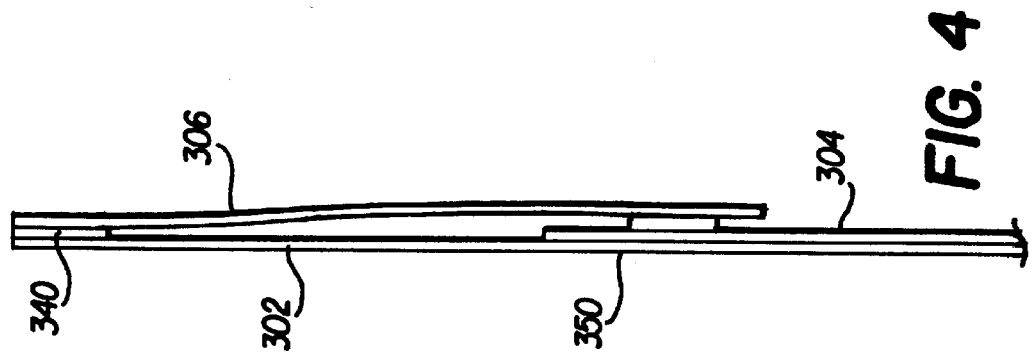
FIG. 4 depicts a side view of the present packing slip envelope in the closed position.
Figure 3:
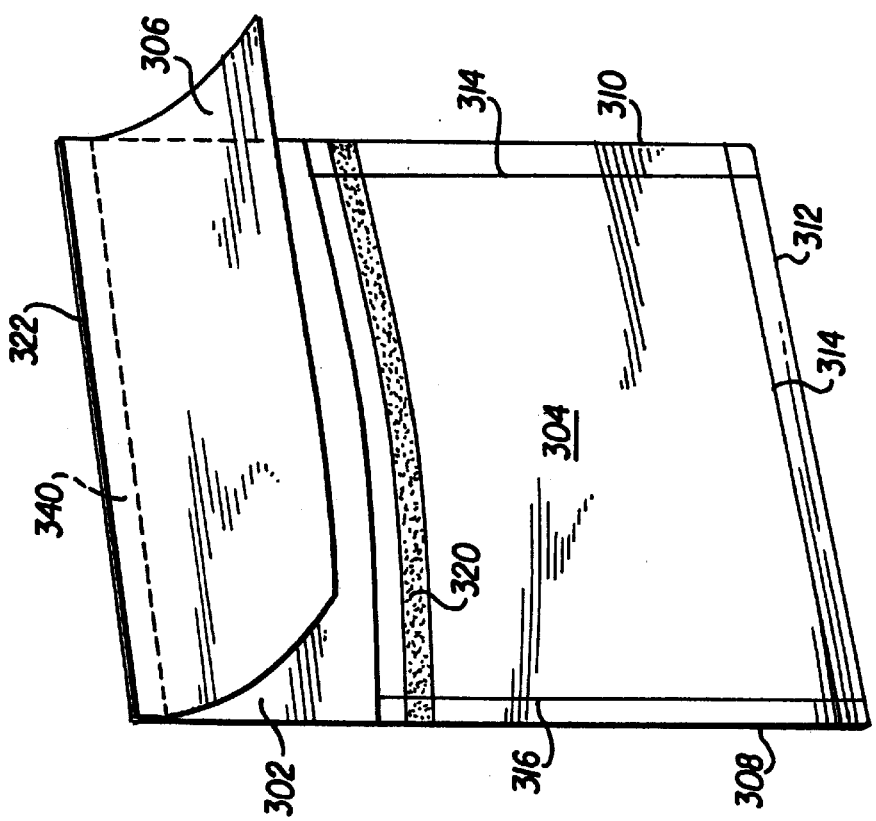
FIG. 3 depicts a front view of the present packing slip envelope in the open position.

FIG. 3 shows a front view and FIG. 4 shows a side view of a preferred embodiment of the instant invention. In this preferred embodiment, the envelope is at least partially made of a transparent (or translucent), flexible plastic such as polyethylene or polypropylene. The inventive envelope comprises three sheets of plastic, a back sheet 302, a front sheet 304, and a closure flap 306, where at least the front sheet is transparent (or translucent). The back sheet 302 and the front sheet 304 are joined at their respective side edges and bottom edges. The closure flap and the back sheet are joined at their respective top edges 322 via a permanent adhesive 340. The closure flap overlaps the front sheet and forms a closure when the closure flap attaches to the front sheet via a strip of resealable adhesive 320. The closed bag can be opened by breaking the seal between the closure flap 306 and the front sheet 304 along the resealable adhesive strip 320. And the bag can be resealed by contacting the flap 306 and the front sheet 304 and applying pressure along the adhesive strip 320.

Most preferably, the joint of the front sheet to the back sheet is accomplished through heat sealing. Generally, this involves aligning the overlapping edges of the plastic sheets being sealed and applying pressure adjacent to the edges-with a heated element which melts the plastic and welds the plastic sheets together. Various machines for performing heat sealing operated by means of AC or DC power are available commercially through companies such as Accu-Seal Corporation, San Marcos, Calif. U.S. Pat. No. 5,142,123 to Chou discloses a heat sealing machine appropriate for the instant application.

The resealable adhesive 320 of the present invention may be made of, for example, pressure-sensitive adhesive material or contact adhesive material. Preferably, the closures of the present invention are useful with adhesive systems such as pressure-sensitive adhesive materials including acrylic, natural and synthetic rubber types. Adhesives having good peel strength are also preferred. Further, it is preferable that the force required to separate the closure flap from the front sheet along the resealable adhesive strip 320 does not damage or cause tearing of the plastic.

Generally, resealable adhesive has some tack but can be opened and closed repeatedly and leaves no residue. Common examples of resealable adhesives are the adhesive used on Post-it® notes and Craig-Stick®. Resealable adhesives of various level of peel strength and tack or residue are available commercially.

The resealable adhesive is preferable disposed as a strip as shown in FIG. 3. The strip preferably has a width of about 0.1 to 0.8 inches. However, other pattern may also be used without affecting the invention. These other pattern may be dots, multiple thin strips, etc.

The permanent adhesive 340 can be any permanent adhesive commonly used. The main property that distinguishes the permanent adhesive 340 from the resealable adhesive is that once the bond of the permanent adhesive 340 is broken, it cannot further function as an adhesive; i.e., it's not resealable. Further, the bond strength of the permanent adhesive 340 is preferably much higher than that of the resealable adhesive 320. As a matter of fact, a significant property of the permanent adhesive 340 is that it can absorb the force required to open the resealable adhesive 320 without failure, separating, or pealing. Preferred permanent adhesive includes acrylic adhesives and hot melt adhesives. A backing adhesive 350 can be provided which is preferably permanent to permit the resealable envelope to be attached to a package or other shipping container. The envelope can be printed either on the front sheet 304, flap 306 or back sheet 302.

The invention has been disclosed broadly and illustrated in reference to representative embodiments described above. Those skilled in the art will recognize that various modifications can be made to the present invention without departing from the spirit and scope thereof.

What is claimed is:

1. A resealable envelope comprising
  a flexible plastic back sheet;
  a backing adhesive applied on a back surface of said flexible plastic back sheet to attach the envelope to a package;
  a flexible plastic front sheet, said front sheet and said back sheet attaching at their respective side edges and bottom edges;
  a flexible plastic closure flap, said closure flap being adhered directly to a front surface of said back sheet at their respective top edges via a permanent adhesive, said closure flap overlaping said front sheet; and
  a resealable adhesive locating proximal to the top edge of said front sheet such that said resealable adhesive is capable of fastening said closure flap to said front sheet forming a resealable closure.

2. The resealable envelope of claim 1, wherein the front sheet and back sheet are attached via heat sealing.

3. The resealable envelope of claim 1, wherein said resealable adhesive is a pressure-sensitive adhesive.

4. The resealable envelope of claim 1, wherein said resealable adhesive is disposed as a strip proximate to the top edge of the front sheet.

5. The resealable envelope of claim 1, wherein the permanent adhesive is a an acrylic adhesive.

6. The resealable envelope of claim 1, wherein the flexible plastic is polyethylene or polypropylene.

7. The resealable envelope of claim 1, wherein the permanent adhesive can absorb a force required to open the resealable adhesive without failure.

8. The resealable envelope of claim 1, wherein the flexible plastic front sheet is transparent.

9. A method of making a resealable envelope, said method comprising
  providing a front sheet, a back sheet, and a plastic closure flap;
  attaching said front sheet to said back sheet at their respective side edges and bottom edges;
  attaching said closure sheet directly to a front surface of said back sheet at their respective top edges via a permanent adhesive, said top sheet overlapping said front sheet;
  providing a resealable adhesive proximal to the top edge of said front sheet such that said resealable adhesive is capable of removably fastening said closure flap to said front sheet; and providing a backing adhesive on a back surface of said back sheet for attaching the resealable envelope to a package.

10. The method of claim 9, wherein the front sheet and back sheet are attached via heat sealing.

11. The method of claim 9, wherein said resealable adhesive is a pressure-sensitive adhesive.

12. The method of claim 9, wherein said resealable adhesive is disposed as a strip proximate to the top edge of the front sheet.

13. The method of claim 9, wherein the permanent adhesive is an acrylic adhesive.

14. The method of claim 9, wherein the flexible plastic is polyolefin.

15. The method of claim 9, wherein the permanent adhesive is capable of absorbing a force required to open the resealable adhesive without failure.

16. The method of claim 9, wherein the flexible plastic front sheet is transparent.

17. A resealable envelope comprising a flexible plastic back sheet;

a backing adhesive on a back surface of said back sheet for attaching the envelope to a package;

a transparent and flexible plastic front sheet, said front sheet and said back sheet attaching at their respective side edges and bottom edges via heat sealing;

a resealable adhesive strip locating proximal to the top edge of said front sheet; and a flexible plastic closure flap, said closure flap being adhered directly to a front surface of said back sheet at their respective top edges via a permanent adhesive, said closure flap overlaping said front sheet such that said resealable adhesive strip is capable of fastening said closure flap to said front sheet forming a resealable closure, said permanent adhesive is capable of absorbing a force required to open the resealable adhesive without failure.

18. The resealable envelope of claim 17, wherein the plastic back sheet is printable or tinted.

19. The resealable envelope of claim 17, wherein the plastic front sheet is printable or tinted.

20. The resealable envelope of claim 17, wherein the plastic closure flap is printable or tinted.

* * * * *